E. PETTERSON.
RANGE FINDER.
APPLICATION FILED AUG. 28, 1917.

1,289,534.

Patented Dec. 31, 1918.
2 SHEETS—SHEET 1.

Inventor
Ernst Petterson
By Frederick V. Winters
Attorney

UNITED STATES PATENT OFFICE.

ERNST PETTERSON, OF ASTORIA, NEW YORK.

RANGE-FINDER.

1,289,534. Specification of Letters Patent. Patented Dec. 31, 1918.

Application filed August 28, 1917. Serial No. 188,588.

*To all whom it may concern:*

Be it known that I, ERNST PETTERSON, a citizen of the United States, residing at Astoria, in the county of Queens and State of New York, have invented certain new and useful Improvements in Range-Finders, of which the following is a full, clear, and exact specification.

This invention relates to range finders, and has for its object to provide improved means for quickly ascertaining the distance between the instrument and a target or object at a distant point without the use of a tape or linear measure and without any computation based upon angles, etc. It is the aim of the present invention to provide an instrument having readings and means to coöperate with said readings for indicating thereon the actual distance to the target or distant object. The invention also contemplates indicating the angle of altitude or depression of the target as well as the distance thereof. Other objects will appear as the description proceeds.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Figure 1:
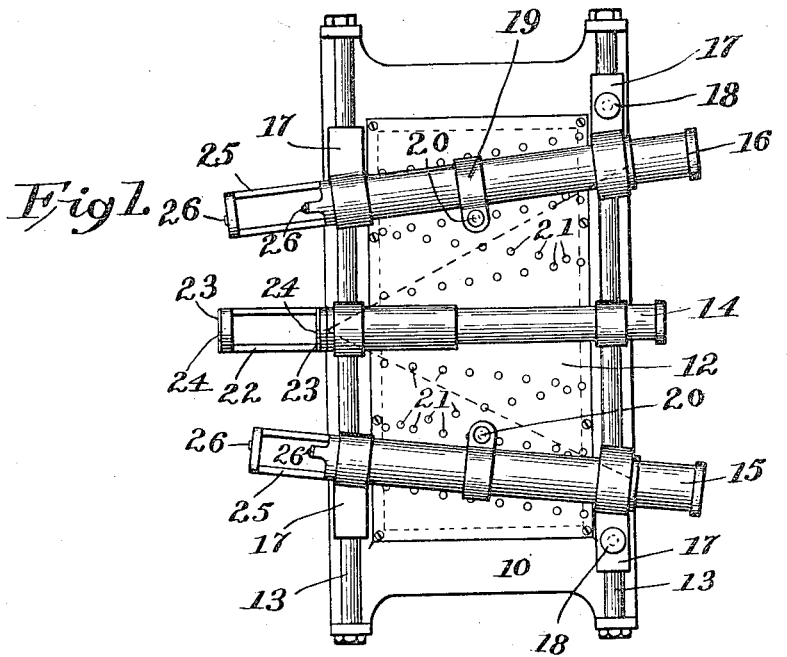
Figure 1 is a plan view of a range finder constructed substantially in accordance with this invention.
Figure 2:
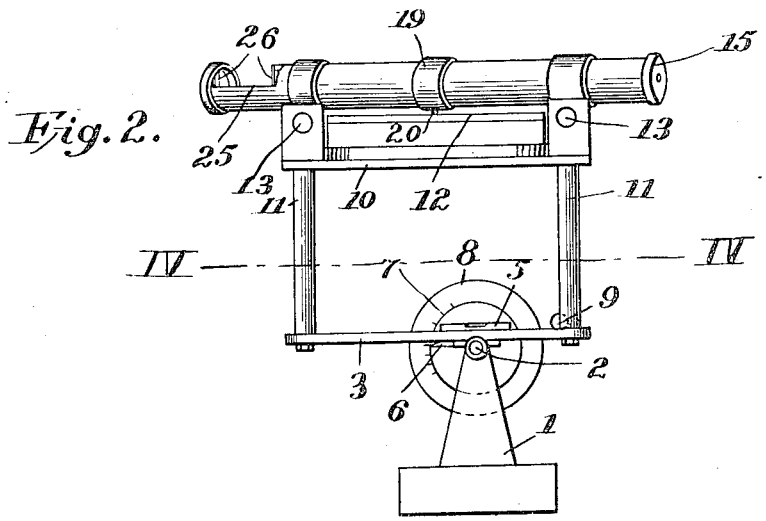
Fig. 2 is a side elevation thereof.
Figure 3:
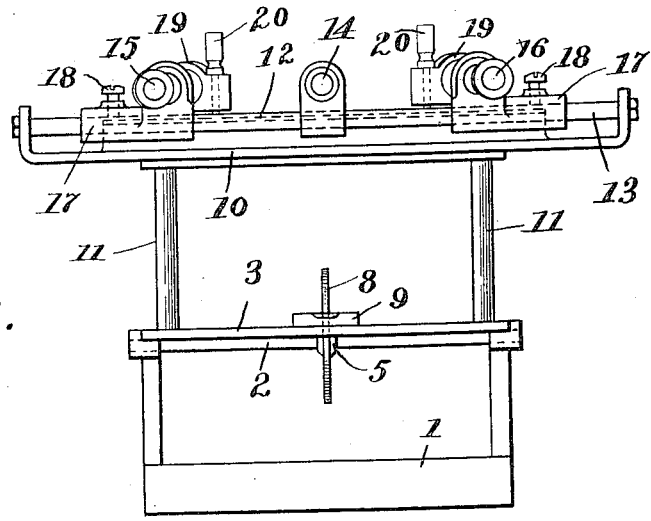
Fig. 3 is a front elevation of the same.
Figure 4:
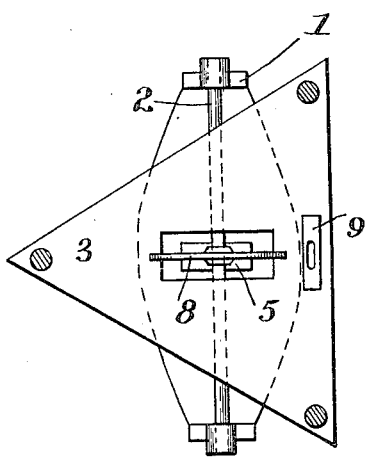
Fig. 4 is a section on the line IV—IV of Fig. 2.
Figure 5:
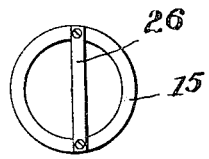
Fig. 5 is an outer end view of one of the movable telescopes.
Figure 6:
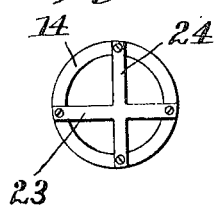
Fig. 6 is a similar view of the middle or stationary telescope.

The instrument comprises a pair of parallel frames rigidly connected together and supported upon any suitable form of stand 1 by means of a rock shaft 2 rigidly fastened to the stand and journaled in the bottom frame or plate 3. The shaft 2 has a spirit level 5 fixed thereto in any suitable manner, the same extending longitudinally of the frame and being provided with a pointer 6 adapted to indicate on the scale 7 marked on a ring 8 carried by the frame 3, the angle of elevation or depression of the target sighted through the telescopes of the instrument. The level 5 also serves as a means for initially adjusting the instrument to stand in a true horizontal plane. A transversely extending spirit level 9 mounted on the frame 3 serves as an additional means of leveling the instrument at the outset.

The upper frame 10 is rigidly supported in parallel relation to the frame 3 by posts 11 and carries a raised platform 12 and two parallel rods or slideways 13 at either edge of the platform, that is, at the front and rear edges thereof. A fixed telescope 14 is arranged at the middle of the platform, while movable telescopes 15 and 16 are mounted at each side of the fixed telescope to slide on the rods 13. Each telescope extends across the platform from one of the rods 13 to the other, and the end portions of the movable telescopes are rigidly mounted on carriages 17 on the rods. One carriage of each movable telescope is provided with a set screw 18 for clamping it to the rod 13 in any desired adjustment. The two movable telescopes converge in opposite directions toward the middle stationary telescope, so that by sliding either of the movable telescopes toward or away from the middle telescope, the target may be sighted through both the stationary and said movable telescopes.

Each of the movable telescopes carries a loose collar or sleeve 19 adapted to slide along the same between the carriages 17 so as to traverse the platform 12. The sleeve or collar 19 is provided with a vertical pin 20 adapted to drop into any one of a zigzag series of perforations or sockets 21 in the platform. Each of these perforations or sockets is to be marked corresponding to a scale to indicate the distance of the target when the movable telescope is in position for the pin 20 to drop into the same. As illustrated in Fig. 1, the zigzag sockets or perforations are on different inclinations from the movable telescopes, so that each of said movable telescopes must be in a different position to have their pins 20 engage different sockets or perforations. It is evident, therefore, that after the distances corresponding to each of said perforations or sockets is determined once by actual measurement, the instrument may be afterward used to tell the distance to any distant point according to which one of said perforations or sockets is engaged by the pin.

The platform may bear indicia opposite each perforation or socket, or a corresponding chart may be used bearing the indicia showing the distance corresponding to each of said perforations or sockets.

The outer end of the stationary telescope projects some distance beyond the platform, and said projecting portion has its upper half cut away, as at 22, to admit light into the same. At opposite ends of said cut away portion, pairs of horizontal and vertical sighting edges or strips 23 and 24, respectively, are fastened, said strips being in alinement so that in sighting through the telescope 14 the target is brought into register with both sets of strips. The horizontal strips 23 are designed, of course, to determine the angle of elevation or depression of the target in connection with the scale 7 and pointer 6 already described, while the vertical strips 24 determine the proper line on which the position of the movable telescope is based in computing the distance to the target.

Each of the movable telescopes 15 and 16 is also provided with a projecting end portion having its upper half cut away, as at 25, and at opposite ends of said cut away portion there are arranged registering vertical sighting strips 26. No horizontal sighting strips are necessary on the movable telescopes because the angle of elevation or depression is determined by the horizontal strips 23 on the stationary telescope.

One of the movable telescopes is sufficient, but two are provided in the interest of accuracy and so that one may be used as a check on the other. To find the range or distance to a target, the stationary telescope is first sighted thereon, and the movable telescope at either side then brought into position where the target may also be sighted therethrough, and the perforation or socket 21 of the zigzag series in the platform into which the pin 20 fits will then determine the distance. The perforations 21 are arranged in zigzag lines in order to secure very fine shades of difference in the adjustments of the movable telescopes.

Having thus described my invention, what I claim as new and desire to secure by Letters Patent of the United States is:—

1. The combination, with a stationary telescope, of a movable telescope mounted to slide to and from the stationary telescope, and arranged at a constant angle of inclination thereto, and distance indicating means coöperating with said telescopes for determining the distance to a target sighted through both telescopes.

2. The combination, with a stationary telescope, of a movable telescope mounted to slide to and from the stationary telescope, and arranged at a constant angle of inclination thereto, a platform in fixed relation to the stationary telescope, a pin carried by the movable telescope, and the platform having means adapted to be engaged by said pin for determining the distance to a target sighted through both telescopes.

3. The combination, with a stationary telescope, of a movable telescope mounted to slide to and from the stationary telescope, and arranged at a constant angle of inclination thereto, a platform in fixed relation to the stationary telescope, a collar mounted to slide along the movable telescope to traverse the platform, the latter having a series of sockets arranged at a different angle from the movable telescope, and a pin carried by said collar to fit in one of said sockets for determining the distance to a target sighted through both telescopes.

4. The combination, with a stationary telescope, of a movable telescope mounted to slide to and from the stationary telescope, and arranged at a constant angle of inclination thereto, a platform in fixed relation to the stationary telescope, a collar mounted to slide on the movable telescope to traverse the platform, the latter having zigzag series of sockets therein at different angles from the movable telescope, and a pin carried by said collar to engage one of said sockets for determining the distance to a target sighted through both telescopes.

In testimony whereof I have signed my name to this specification.

ERNST PETTERSON.

Copies of this patent may be obtained for five cents each, by addressing the "Commissioner of Patents, Washington, D. C."